United States Patent
Prakash et al.

(10) Patent No.: US 7,411,593 B2
(45) Date of Patent: Aug. 12, 2008

(54) IMAGE ROTATION WITH SUBSTANTIALLY NO ALIASING ERROR

(75) Inventors: Ravi Prakash, Concord, NC (US); Clair Frederick Rohe, Huntersville, NC (US); Robert E. Shirley, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 09/816,318

(22) Filed: Mar. 28, 2001

(65) Prior Publication Data
US 2002/0171664 A1 Nov. 21, 2002

(51) Int. Cl.
*G09G 5/24* (2006.01)
(52) U.S. Cl. ............... 345/611; 345/530; 345/649; 382/298; 382/296
(58) Field of Classification Search ............ 345/611, 345/639, 640, 641, 643, 644, 646, 647, 648, 345/649, 428, 422, 469.1, 470, 629, 530; 382/267, 268, 269, 275, 296, 297, 298
See application file for complete search history.

(56) References Cited

U.S. PATENT DOCUMENTS

| | | | | |
|---|---|---|---|---|
| 4,432,009 A | * | 2/1984 | Reitmeier et al. | 348/580 |
| 4,618,991 A | * | 10/1986 | Tabata et al. | 382/277 |
| 4,685,141 A | * | 8/1987 | Hoque et al. | 382/138 |
| 4,759,076 A | * | 7/1988 | Tanaka et al. | 382/277 |
| 5,191,438 A | * | 3/1993 | Katsurada et al. | 382/290 |
| 5,483,606 A | * | 1/1996 | Denber | 382/294 |
| 5,504,822 A | * | 4/1996 | Holt | 382/218 |
| 5,506,918 A | * | 4/1996 | Ishitani | 382/289 |
| 5,563,403 A | * | 10/1996 | Bessho et al. | 250/208.1 |
| 5,583,956 A | * | 12/1996 | Aghajan et al. | 382/290 |
| 5,717,794 A | * | 2/1998 | Koga et al. | 382/309 |
| 5,832,110 A | * | 11/1998 | Hull | 382/168 |
| 5,856,877 A | * | 1/1999 | Burger et al. | 358/452 |
| 5,864,629 A | * | 1/1999 | Wustmann | 382/135 |
| 5,903,276 A | * | 5/1999 | Shiraishi | 345/600 |
| 5,940,544 A | * | 8/1999 | Nako | 382/293 |
| 5,946,426 A | * | 8/1999 | Carlebach | 382/299 |
| 6,016,752 A | * | 1/2000 | Harari | 101/486 |
| 6,064,778 A | * | 5/2000 | Pasco et al. | 382/289 |

(Continued)

OTHER PUBLICATIONS

Hierarchical Block Matching Method for Fast Rotation of Binary Images☐☐Sung-Il Chien and Yung-Mok Baek; IEEE Transactions on Image Processing, vol. 10, No. 3, Mar. 2001.*

(Continued)

*Primary Examiner*—Kee M. Tung
*Assistant Examiner*—Javid A Amini
(74) *Attorney, Agent, or Firm*—Douglas Lashmit; Hoffman, Warnick & D'Alessandro LLC

(57) ABSTRACT

A system, method and program product for rotating a first image in an image buffer such that the resulting, rotated image is substantially free of an aliasing error, i.e., broken lines, stair stepped edges, etc., is disclosed. An algorithm is applied to the first image that uses weighted sums of data points of the first image to create the rotated image. The weighting is based on the skew angle and data point location of the first image. The resulting rotated image also has a reduced data storage space requirement compared to rotated images created by prior art techniques.

11 Claims, 4 Drawing Sheets

U.S. PATENT DOCUMENTS

| | | | | |
|---|---|---|---|---|
| 6,111,984 | A * | 8/2000 | Fukasawa | 382/209 |
| 6,131,807 | A * | 10/2000 | Fukuda et al. | 235/494 |
| 6,151,576 | A * | 11/2000 | Anderson et al. | 382/269 |
| 6,154,576 | A * | 11/2000 | Anderson et al. | 382/269 |
| 6,178,270 | B1 * | 1/2001 | Taylor et al. | 382/284 |
| 6,249,360 | B1 * | 6/2001 | Pollard et al. | 358/473 |
| 6,262,732 | B1 * | 7/2001 | Coleman et al. | 345/835 |
| 6,415,064 | B1 * | 7/2002 | Oh | 382/289 |
| 6,473,519 | B1 * | 10/2002 | Pidhirny et al. | 382/140 |
| 6,489,956 | B1 * | 12/2002 | Deering | 345/419 |
| 6,532,303 | B2 * | 3/2003 | Saiga | 382/198 |
| 6,549,680 | B1 * | 4/2003 | Revankar | 382/289 |
| 6,678,071 | B1 * | 1/2004 | Saito et al. | 358/1.2 |
| 6,771,842 | B1 * | 8/2004 | Sakai et al. | 382/290 |
| 6,959,121 | B2 * | 10/2005 | Kumazawa | 382/294 |
| 7,065,261 | B1 * | 6/2006 | Horie | 382/289 |
| 2001/0007116 | A1 * | 7/2001 | Zhou et al. | 710/100 |
| 2002/0025081 | A1 * | 2/2002 | Kumazawa | 382/289 |
| 2002/0028027 | A1 * | 3/2002 | Koyama | 382/289 |
| 2002/0057838 | A1 * | 5/2002 | Steger | 382/197 |
| 2002/0171664 | A1 * | 11/2002 | Prakash et al. | 345/611 |
| 2002/0191847 | A1 * | 12/2002 | Newman et al. | 382/176 |
| 2004/0037459 | A1 * | 2/2004 | Dodge | 382/154 |

OTHER PUBLICATIONS

VLSI implementation of real-time image rotation Bhandakar, S.M.; Huaiyuan Yu; Image Processing, 1996. Proceedings., International Conference on , vol. 1 , Sep. 16-19, 1996; pp. 1015-1018 vol. 2.*

A moment-based approach for deskewing rotationally symmetric shapes Soo-Chang Pei; Ji-Hwei Horng; Image Processing, IEEE Transactions on , vol. 8 , Issue: 12 , Dec. 1999; pp. 1831-1834.*

Hardware for image rotation by twice skew transformationsTsuchida, N.; Yamada, Y.; Ueda, M.;Acoustics, Speech, and Signal Processing [see also IEEE Transactions on Signal Processing], IEEE Transactions on , vol. 35 , Issue: 4 , Apr. 1987; pp. 527-525.*

Bar Codes in Document Imaging, by: Larry Krummel,edited by Jeff Frankel, Third Edition—Aug. 1996.*

* cited by examiner

IMAGE ROTATION WITH SUBSTANTIALLY NO ALIASING ERROR

BACKGROUND OF THE INVENTION

1. Technical Field

The present invention relates generally to document imaging and, more particularly, to image rotation with substantially no aliasing error in the resulting image.

2. Related Art

Digital imaging of documents, photographs and other objects provides numerous advantages including the ability to easily process, analyze and communicate images. One common method of creating a digital image is scanning. During scanning, a rectangular window, called an image buffer, which includes the image is typically created. An actual image is then extracted from the image buffer so further data analysis may be conducted on just the image. It is not an infrequent occurrence, however, for the object being scanned to be skewed or angled relative to the image window representation of the image buffer. During the extraction process, it therefore becomes advantageous to rotate the image to attain a properly justified replication.

Present extraction processes are often inadequate for creating accurate replications of images after rotation because the extraction process imposes mistakes in the images. The mistakes, referred to as artifacts, may include such things as broken lines, stepped edges and other abnormalities. One particular type of artifact is referred to as "aliasing error," and generally includes stepping or breaks in lines of the image. Current correction methods for these mistakes are inadequate, processor intensive and time consuming.

Another challenge faced by users of digital imaging is to balance the desire to retain details in images while minimizing storage space for images. Data compression techniques, for example JPEG, have been developed to increase the ability to retain details, but reduction of data storage remains a problem.

In view of the foregoing, there is a need for a high speed system and method for rotating an image such that the resulting image is substantially free of aliasing errors. It would also be advantageous if this system and method reduced data storage requirements.

SUMMARY OF THE INVENTION

In a first aspect of the invention is provided a method of rotating a first image in an image buffer, the method comprising the steps of: extracting first image data from the image buffer; and creating a rotated image that is substantially free of aliasing error using weighted sums of data points of the first image, wherein weighting depends on a skew angle of the first image and data point location in the first image.

In a second aspect of the invention is provided a system for rotating an initial image stored in an image buffer, the system comprising: an image rotation module configured to rotate the initial image to create a rotated image by using weighted sums of data points of the initial image, wherein the weighting depends on a skew angle of the initial image and data point location in the initial image.

A third aspect of the invention provides a computer program product comprising a computer useable medium having computer readable program code embodied therein for processing a first image in an image buffer, the computer program product comprising: program code configured to rotate the first image to create a rotated image by using weighted sums of data points of the first image, wherein the weighting depends on a skew angle of the initial image and data point location in the first image.

In a fourth aspect of the invention is provided a system for rotating an initial image stored in an image buffer, the system comprising: an image rotation module configured to rotate the initial image to create a rotated image that is substantially free of an aliasing error.

The above-described invention provides a high speed system and method for rotating an image such that the resulting image is substantially free of aliasing errors. As an additional benefit, they also provide a reduction in data storage space requirements because of their ability to remove aliasing errors.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Although certain preferred embodiments of the present invention will be shown and described in detail, it should be understood that various changes and modifications may be made without departing from the scope of the appended claims. The scope of the present invention will in no way be limited to the number of constituting components, materials thereof, shapes thereof, relative arrangement thereof, etc., and are disclosed simply as an example of the preferred embodiment.

Figure 1:
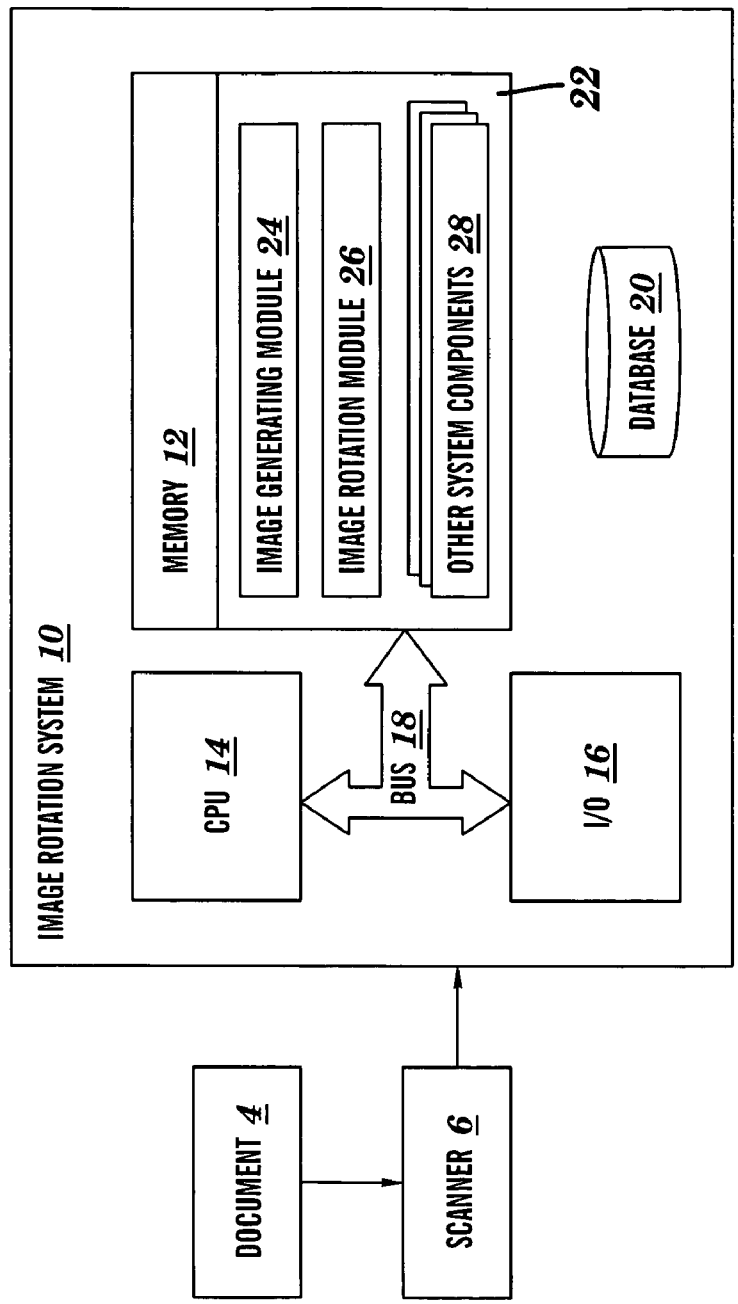
FIG. 1 shows a block diagram of an image rotation system in accordance with the invention.

FIG. 1 is a block diagram of an image rotation system 10 including an image rotation module 26 in accordance with a preferred embodiment of the present invention. System 10 preferably includes a memory 12, a central processing unit (CPU) 14, input/output devices (I/O) 16 and a bus 18. A database 20 may also be provided for storage of image data and other data relative to processing tasks. Memory 12 preferably includes a program product 22 that, when executed by CPU 14, comprises various functional capabilities described in further detail below. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems. CPU 14 may likewise comprise a single processing unit, or a plurality of processing units distributed across one or more locations. I/O 16 may comprise any known type of input/output device including a network system, modem, keyboard, mouse, scanner, voice recognition system, CRT, printer, disc drives, etc. Additional components, such as cache memory, communication systems, system software, etc., may also be incorporated into system 10.

Image rotation system 10 may be implemented in a variety of forms. For example, system 10 may be part of a high speed, high volume document processing system such as found in institutional banks. For example, system 10 may be implemented as part of an IBM 3897 Image Capture System. In this case, system 10, as recognized in the field, may include one or more networked computers, i.e., servers. In this setting, distributed servers may each contain only one system/module with the remainder of the systems/modules resident on a centrally located server. A server computer typically comprises an advanced mid-range multiprocessor-based server, such as the RS6000 from IBM, utilizing standard operating system software, which is designed to drive the operation of the particular hardware and which is compatible with other system components and I/O controllers.

Alternatively, system 10 may be implemented as part of a workstation such as a personal computer. A workstation of this form may comprise, for example, an INTEL PENTIUM III microprocessor, or like processor, such as found in an IBM Aptiva computer.

Memory 12 of system 10 preferably includes a program product 22 that, when executed by CPU 14, provides various functional capabilities for system 10. As shown in FIG. 1, program product 22 may include an image generating module 24, an image rotation module 26, and other system component(s) 28. Other system components 28 may include any well known document processing system components, e.g., an image capture processor, alteration indicating system, etc.

In the following discussion, it will be understood that the method steps discussed preferably are performed by a processor, such as CPU 14 of system 10, executing instructions of program product 22 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

Figure 2:
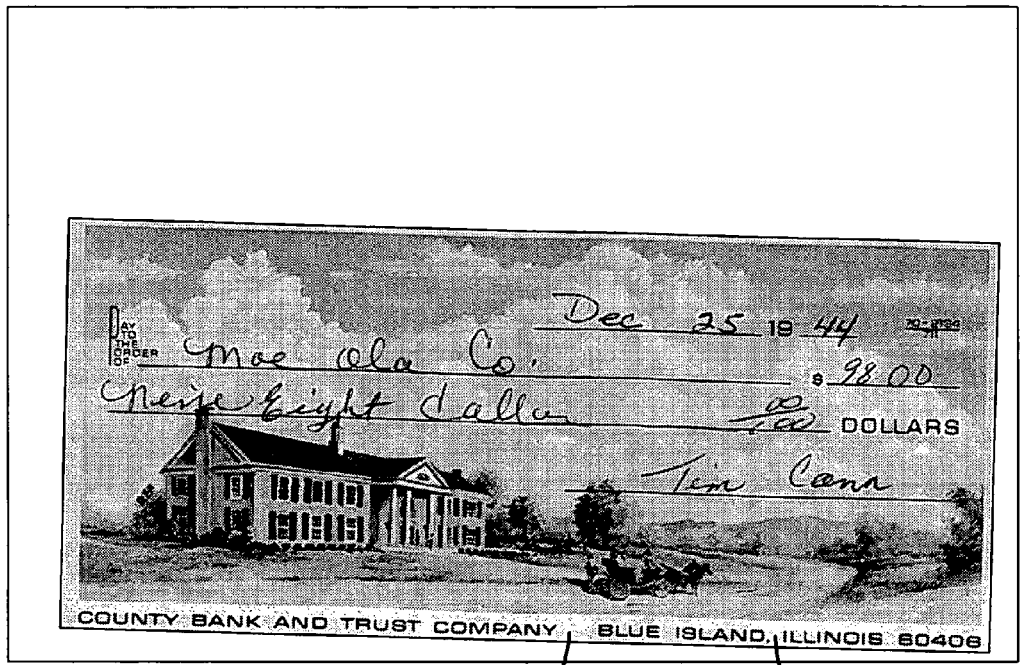
FIG. 2 shows an exemplary skewed image in an image buffer.

Turning to FIG. 2, an initial image 30 is shown as stored in an image buffer 32, i.e., the black field behind initial image 30. Initial image 30 may be created in any known fashion. For instance, as shown in FIG. 1, a document 4 may be scanned by a scanner 6. Image generation module 24 of system 10 may then create initial image 30 based on the data gathered from the scan. Image generation module 24, although shown as part of system 10, may alternatively be provided as part of scanner 6, as known in the art.

For purposes of explanation, initial image 30 is illustrated as that of a document 4 and, more particularly, a check. It should be recognized, however, that the teachings of the present invention may be applied to any image requiring rotation as stored in an image buffer 32. Other examples include, but are not limited to, photographs and objects.

As indicated in FIG. 2, for whatever reason, initial image 30 is skewed or angled relative to horizontal in image buffer 32, i.e., the image is a skewed image 34. The skew is apparent by comparing how edges of initial image 30 are not parallel with the edges of buffer 32. Skewed image 34 may have resulted in an image buffer 32, for example, because an object being scanned was fed into scanner 6 at an angle.

Figure 3:
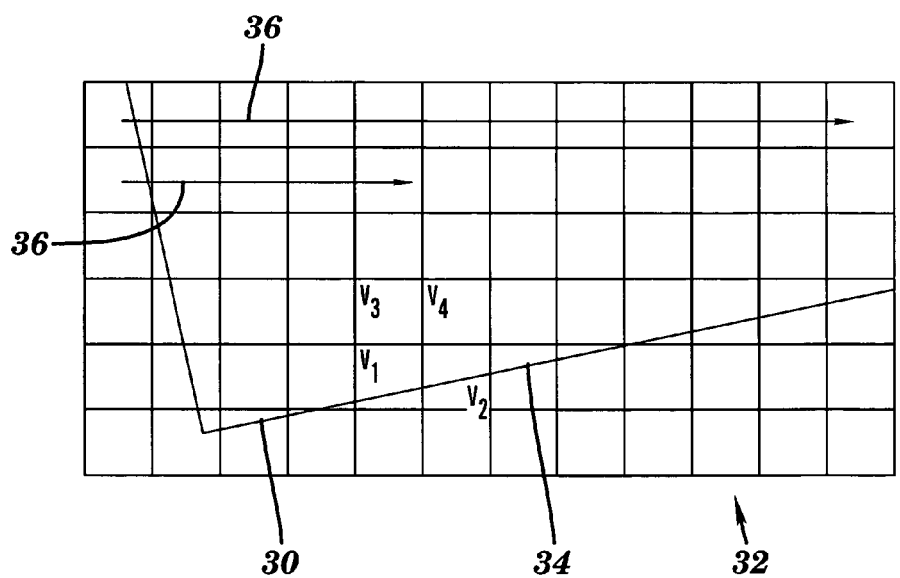
FIG. 3 shows a prior art image extraction process.
Figure 4:
FIG. 4 shows a prior art rotated image created with the process of FIG. 3, which includes a variety of aliasing errors.

Referring to FIGS. 3 and 4, it is customary for initial image 30 to be processed to reduce the space required to store the image. To this end, initial image 30 may be processed to remove the skew angle by rotating the image, i.e., rotate image 30 to be horizontal. In addition, it is customary to reduce the size of the stored data to, for example, the size of initial image 30.

Referring to FIG. 3, a partial analysis of image buffer 32 is shown. As shown, image buffer 32 is comprised of a grid. Image data points, e.g., V1, V2, V3, V4, are indicated by blocks of the grid and represent pixel data. Typically an extraction process begins by establishing the four corners of skewed image 34. Next, as indicated by arrows 36, initial image 30 is read as the extraction process transverses horizontal rows of image data left to right. When the process comes to an end of a horizontal row, the process steps down (or up) image buffer 32 to a next row. As image 30 is read, the image data is processed to generate a rotated image 38.

As shown in FIG. 4, a resulting rotated image 38 based on the known processing techniques includes the presence of artifacts, or mistakes, such as unsmooth lines, broken lines or "stair stepping" of lines. These mistakes are collectively referred to herein as "aliasing errors." Examples of aliasing errors in rotated image 38 are: 1) the broken nature of the character "P" in "PAY TO THE ORDER OF"; 2) stair stepping in the edges of rotated image 38; and 3) broken lines in the pillars of the house in rotated image 38. Generally, aliasing errors are created in rotated image 38 because current processing shifts discrete data points, e.g., V1, V2, V3, V4, etc., in their entirety, as necessary, to rotate the image. While certain aliasing errors have been pointed out, it should be recognized that aliasing errors may take a variety of other forms not listed herein but known to those having ordinary skill in the art.

Figure 5:
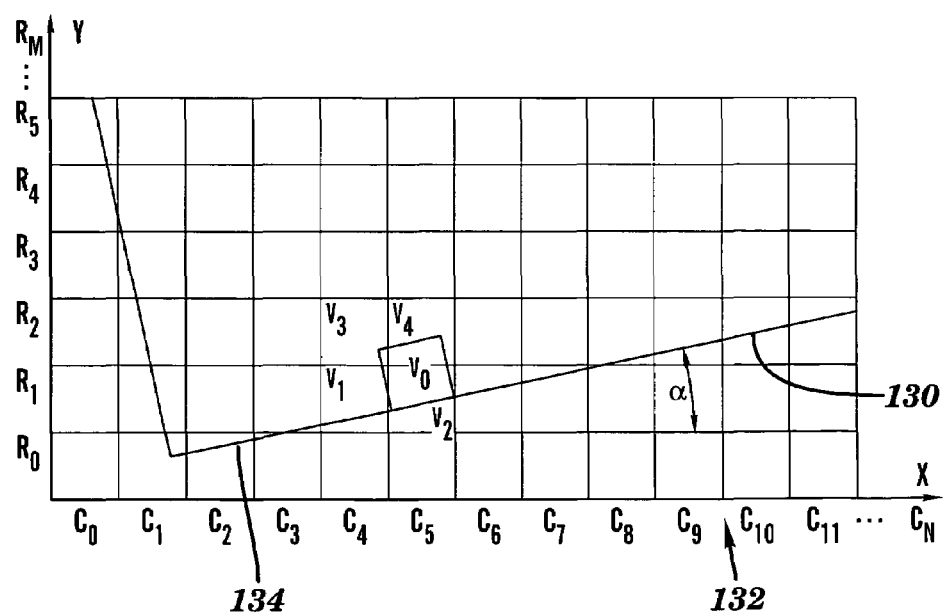
FIG. 5 shows an image extraction process in accordance with the invention.
Figure 6:
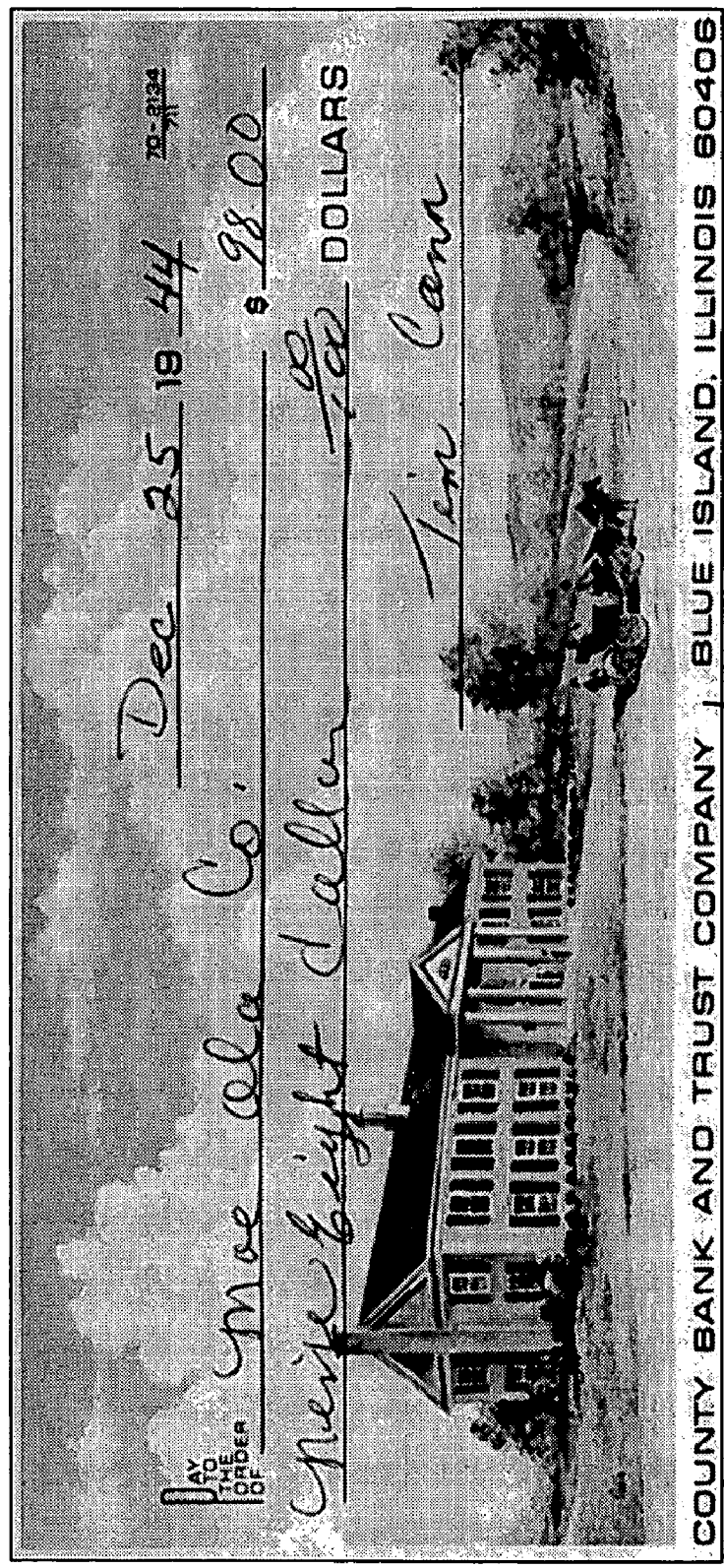
FIG. 6 shows a rotated image created with the process of FIG. 5, and which is substantially free of aliasing errors.

Referring to FIGS. 5 and 6, in accordance with the present invention, during extraction of an initial or first image 130, data points to be provided in the resulting image are created using an algorithm that provides a rotated image 138 (FIG. 6) that is substantially free, i.e., indiscernible to the human eye, of aliasing errors. In particular, the algorithm creates a rotated image by using weighted sums of data points of initial image 130. The fractions used to weight the sums are dependent on a skew angle of initial image 130 and data point location in initial image 130.

For purposes of clarity in the following description, the present invention will initially be explained in terms of rotating an image to horizontal. In this regard, the terms "skew" and "skew angle" will be used to describe an angle of an initial image 130 relative to horizontal. However, as the present invention is capable of rotating an image to any desired angle, as will be explained below, the terms "skew" and "skew angle" ultimately should not be limited to that meaning.

FIG. 5 shows a partial analysis of an image buffer 132 in accordance with the invention. Neighboring image data points, e.g., V1, V2, V3, V4, of a skewed image 134 are indicated by blocks of the grid and represent pixel data values. As before, processing begins by establishing the four corners of a skewed image 134 in a known fashion. Next, image 130 is extracted by reading transverse horizontal rows of image data in image buffer 132 left to right (e.g., row $R_M$ to $R_0$, where M is an integer) and stepping down image buffer 132 when an end of a horizontal row is reached. In accordance with a preferred embodiment of the invention, however, data points of resulting rotated image 138 (FIG. 6) are calculated according to the following rotation algorithm:

$$V_o = K_h * K_v (V1 + V4 - V2 - V3) + K_h (V3 - V4) + K_v (V2 - V4) + V4$$

In the algorithm, $V_o$ is a data point of rotated image 138; V1, V2, V3 and V4 are data points of the initial image that each incorporate a portion of $V_o$; and $K_h$ and $K_v$ are fractions that are functions of skew angle α and data point (pixel) location of initial image 130. In a preferred embodiment, data points V1, V2, V3 and V4 are not all on the same horizontal row in image buffer 132, i.e., data points are in adjacent rows of the image buffer, as shown in FIG. 5. Hence, the algorithm uses weighted sums of neighboring data points on adjacent rows of image buffer 132 to create data points $V_0$ of a resulting, rotated image 138. For clarity, the term "sums," as use herein, includes addition and subtraction of data point values.

As extraction takes place, data point pair V3 and V4 are first ascertained (assuming a left to right and top to bottom progression) and buffered. When data point pair V1 and V2 are ascertained, non-skewed image data point $V_o$ is calculated using the above algorithm. The process is repeated for every four data points of initial image 130 until all of the data points of rotated image 138 are generated.

In a preferred embodiment of the invention, fractions $K_h$ and $K_v$ are implemented as 1/8th increments, i.e., 1/8, 1/4, 3/8, 1/2, 5/8, 3/4 and 7/8. $K_h$ indicates a horizontal fraction (for each X X coordinate in columns $C_0$ to $C_N$, where N is an integer), and $K_v$ indicates a vertical fraction (for Y coordinate in rows $R_0$ to $R_M$). Increments of $K_h$ and $K_v$ may be determined, for example, by dividing an indexing number by eight (8) to arrive at an increment number. The "indexing number" is the number of data points the extraction process must process in a first direction (e.g., horizontally) before stepping one row or column in the other direction. As an example, the indexing number of data points necessary to progress horizontally (e.g., along row $R_0$) before stepping one row vertically (i.e., from $R_0$ to $R_1$ in the Y-direction) may be found by taking the inverse of the tangent of skew angle α. As an example, for a skew angle of 1°, the indexing number is approximately 57 data points (i.e., 1/tangent 1°), which divided by eight (8) provides an increment number of approximately seven (7). The dispersion of fraction $K_h$ may then be distributed as follows: for data points 0-7 (i.e., data points corresponding to columns $C_0$ to $C_7$), $K_h$=1/8; data points 8-14, $K_h$=1/4; data points 15-21, $K_h$=3/8; and so on up to the 57th data up to the 57th data point. As is apparent from the above distribution, where the indexing number is not divisible by eight, the distribution is made as close as possible to even segments.

If image 30 has perpendicular sides, values for $K_v$ may be determined by the same formula as $K_h$. That is, horizontal rows 0-7 (i.e., rows $R_{0-7}$) of data points, $K_v$=1/8; rows 8-14, $K_v$=1/4; rows 15-21, $K_v$=3/8, and so on. As horizontal rows are extracted, the vertical ($R_0$ to $R_M$) coordinate is incremented by one (1) up or down depending on the direction of extraction, which allows for determination of an appropriate $K_v$ fraction.

If image 30 does not have perpendicular sides, increment numbers will vary for $K_h$ and $K_v$ depending on their respective skew angle. That is, values of $K_h$ and $K_v$ will be provided according to the respective skew angle in the respective horizontal and vertical directions.

The appropriate values for $K_h$ and $K_v$ are preferably stored in at least one lookup table based on a predetermined number of indexing numbers and data point (pixel, pel) locations. Alternatively, since the indexing number can be associated with a skew angle, a lookup table may be based on skew angle. A look up table as described may take a form as follows; the ranges provided are for respective horizontal and vertical data points in a perpendicular image:

| Ind. No.: 57 | Horizontal C, Vertical R | | | |
|---|---|---|---|---|
| | 0-7: $K_h$ 1/8; 0-7, $K_v$ 1/8 | 8-14, $K_h$ 1/4; 8-14: $K_v$ 1/4 | . . . 42-48: $K_h$ 3/4; 42-48: $K_v$ 3/4 | . . . |

The number of lookup tables provided may be limited to a range based on the anticipated skew angles, e.g., 20-30, or indexing numbers. Arrangement of lookup tables in this fashion provides for minimization of lookup table size because each table's size is based on its associated indexing number.

Where an exact match between actual skew angle/indexing number and a lookup table is not possible, approximations can be provided. For example, if a skew angle is 1.14° (indexing number 50.25) and lookup tables exist for indexing numbers 50 and 51, then the invention may use approximations. For example, values for fractions $K_h$ and $K_v$ may be used from the lookup table for indexing number 50 because it is the closest to the actual indexing number, i.e., 50.25. Alternatively, the invention may alternate between fraction values for indexing numbers 50 and 51, or use some other averaging technique. Similarly, as indicated in the above exemplary lookup table, the number of pixel locations for which a $K_h$ and $K_v$ fraction is given may be limited to ranges, and approximations made to arrive at appropriate fractions.

While the preferred embodiment of the invention has been explained with an increment of 1/8th for fractions $K_h$ and $K_v$ because of its ease of implementation, it should be recognized that other increments may be possible. The direction(s) of extraction may also be altered, i.e., moving horizontally right to left, or starting at the bottom of image buffer 132 and stepping up rather than down.

The resulting rotated image 138 created by using the above-described correction algorithm is illustrated in FIG. 6. Rotated image 138 is substantially free of aliasing errors. For instance, there are no broken lines in the character "P" in "PAY TO THE ORDER OF" or the pillars of the house. Also, stair stepping in the edges of rotated image 138 is not present. Another advantage of the present invention is that it may result in, for example, a 5-10% reduction in the compressed data size of rotated image 138 versus a rotated image 38 created by prior art techniques. This is beneficial in terms of data storage requirements.

In an alternative embodiment of the present invention, the correction algorithm may be simplified by removing the first term, i.e., $K_h*K_v(V1+V4-V2-V3)$. This simplification reduces processor load without creating undue loss of quality.

For clarity, the present invention is described relative to rotation of initial image 130 to a non-skewed or horizontal rotated image 138. However, it should be recognized that the present invention is not limited to rotation of images to horizontal or vertical positions, but also may be applied to rotation of an initial image 130 to any desired rotated angle. In this case, an angle that an initial image 130 is to be rotated may be set by a user. For instance, a user may want to rotate an initial image that is at an angle of 30° relative to horizontal to be 45° relative to horizontal. A skew angle may be determined in these circumstances by taking the difference of the actual angle of initial image 30 (e.g., 30°) and the desired rotated angle (e.g., 45°). In this case, the skew angle is 15°. Application of the present invention to initial image 130 would then rotate it to the desired rotated angle to create a rotated image 138 that is substantially free of aliasing error. In view of the foregoing, the term "skew angle" should not be limited to an angle relative to horizontal or vertical in the following description.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A system for rotating an initial image stored in an image buffer, the system comprising:
   a memory having an image rotation module configured to rotate the initial image to create a rotated image by using weighted sums of a plurality of data points of the initial image that represent pixel data values of the initial image and to output the rotated image from the image buffer, wherein the weighting depends on a skew angle of the initial image and data point location in the initial image,
   wherein the image rotation module repetitively applies the following algorithm to initial image data to create the rotated image:

$$V_0=K_h(V3-V4)+K_v(V2-V4)+V4,$$

wherein $V_0$ is a data point of the rotated image; V2, V3, and V4 are data points of the initial image that each incorporate a portion of $V_0$; and $K_h$ and $K_v$ are fractions that are functions of skew angle and data point location of the initial image.

2. The system of claim 1, wherein the data points of the initial image are in adjacent rows of the image buffer.

3. The system of claim 2, wherein a pair of data points are used from each of the adjacent rows of the image buffer.

4. The system of claim 1, further comprising an image generation module configured to create the initial image.

5. The system of claim 4, further comprising a scanner for supplying data to the image generation module.

6. The system of claim 1, further comprising a database configured to store initial image data.

7. The system of claim 1, wherein $K_h$ and $K_v$ are implemented in ⅛th increments.

8. The system of claim 1, wherein $K_h$ and $K_v$ are provided in a lookup table.

9. A workstation comprising the system for rotating an initial image stored in an image buffer of claim 1.

10. A computer readable medium having a stored computer program product for processing a first image in an image buffer, the computer program product comprising:
    program code configured to rotate the first image to create a rotated image by using weighted sums of a plurality of data points of the first image that represent pixel data values of the first image, wherein the weighting depends on a skew angle of the first image and data point location in the first image; and
    program code configured to output the rotated image from the image buffer,
    wherein the program code configured to rotate the first image repetitively applies the following algorithm to first image data to create the rotated image:

$$V_0=K_h(V3-V4)+K_v(V2-V4)+V4,$$

wherein $V_0$ is a data point of the rotated image; V2, V3, and V4 are data points of the first image that each incorporate a portion of $V_0$; and $K_h$ and $K_v$ are fractions that are functions of skew angle and data point location of the first image.

11. A system for rotating an initial image stored in an image buffer, the system comprising:
    an image rotation module configured to rotate the initial image to create a rotated image that is substantially free of an aliasing error using weighted sums of a plurality of data points of the initial image that represent pixel data values of the initial image and to output the rotated image from the image buffer, wherein weighting depends on a skew angle of the initial image and data point location in the initial image and is implemented in ⅛th increments,
    wherein the image rotation module repetitively applies the following algorithm to initial image data to create the rotated image:

$$V_0=K_h*K_v(V1+V4-V2-V3)+K_h(V3-V4)+K_v(V2-V4)+V4,$$

wherein $V_0$ is a data point of the rotated image; V1, V2, V3, and V4 are data points of the initial image that each incorporate a portion of $V_0$; and $K_h$ and $K_v$ are fractions that are functions

* * * * *